J. C. KORTICK.
TOOL.
APPLICATION FILED OCT. 19, 1915.
1,180,507.
Patented Apr. 25, 1916.
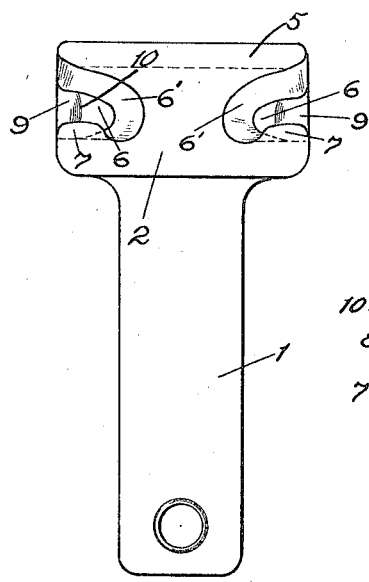
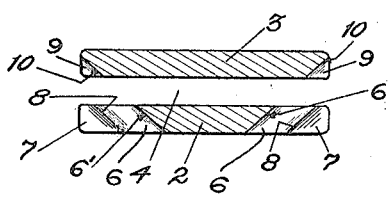
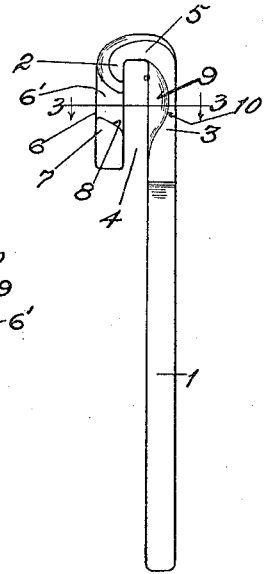
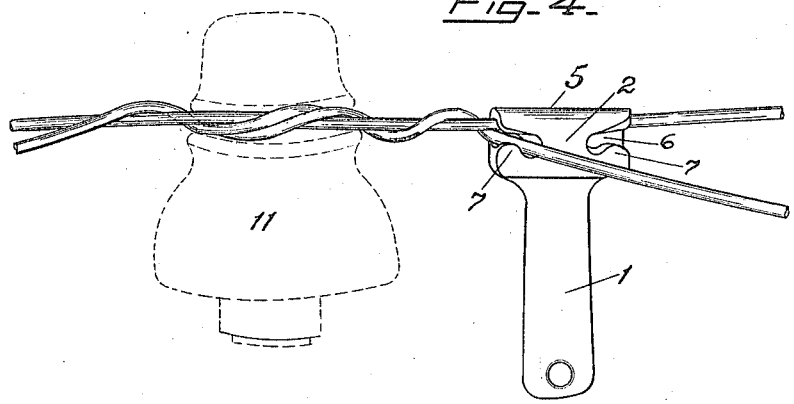
WITNESS
Wm F. Drew
INVENTOR
John C. Kortick
BY
Crescent Totten
ATTORNEYS.

UNITED STATES PATENT OFFICE.

JOHN C. KORTICK, OF SAN FRANCISCO, CALIFORNIA.

TOOL.

1,180,507.      Specification of Letters Patent.      Patented Apr. 25, 1916.

Application filed October 19, 1915. Serial No. 56,742.

*To all whom it may concern:*

Be it known that I, JOHN C. KORTICK, a citizen of the United States, residing in the city and county of San Francisco and State of California, have invented certain new and useful Improvements in Tools, of which the following is a specification.

The present invention relates to a lineman's tool designed particularly for uniting the line and tie wires of a telegraph, telephone or other wire system; and the present invention has for its principal objects to dispense with the hand method or other forms of tying which are now universally in use, and to provide a tool by the employment of which the tie wire is tightly wrapped about the line wire in even spaces, to provide a tool which will not nick or injure the line or tie wires, and by the employment of which the tie will be more quickly made than by the hand process, thereby reducing the cost of making the ties and enabling the lineman to make a greater number thereof within a given time, and one whereby the ends of the tie wire in either a left or right-hand tie about the insulator may be wrapped about the line wire.

With the above-mentioned and other objects in view, the invention consists in the novel construction and combination of parts hereinafter described, illustrated in the accompanying drawings, and pointed out in the claims hereto appended; it being understood that various changes in the form, proportion, size, and minor details of construction may be resorted to without departing from the spirit or sacrificing any of the advantages of the invention.

To more fully comprehend the invention reference is directed to the accompanying drawings, wherein—

Figure 1 is a view in front elevation of an embodiment of my invention. Fig. 2 is a view in side elevation. Fig. 3 is a sectional view taken on line 3—3 of Fig. 2. Fig. 4 is a view of the tool in use.

As shown in the drawings, the tool is preferably formed from a single piece of material and consists of a handle 1, carrying at one end a head composed of members 2 and 3, which members extend parallel to adjacent side faces of each other, and the same are separated by a slot or space 4, which is open at both sides of the head and at the lower edge thereof so as to provide for receiving the line wire when the tool is in use. A connecting member or portion 5 unites the head members 2 and 3 at the upper ends thereof and said member extends for substantially the full width thereof. The head portion 2 is provided at a point approximately centrally of its opposite side edges with alined substantially U-shaped cut-out portions 6, the walls of each of which are beveled rearwardly and outwardly as at 6′ toward the respective outer side edges of the head portion 2. An upwardly projecting tongue or finger 7 overhangs the lower end of each cut-out 6 and provides a means for retaining the tie wire in position therein. To insure an easy sliding of the tie wire through the cut-out or opening, the rear walls of the lugs or fingers are beveled as at 8 to correspond with the bevel in the cut-out. Suitable grooves 9 are provided in the face of the member 3 adjacent the edges thereof and immediately beneath the cut-out portion 6. The wall 10 of each of the grooves is in alinement with the wall 6′ of the corresponding cut-out.

By forming a cut-out portion on each side edge of the head I provide a tool adapted for use by linemen in securing the tie wire to the insulator 11, by either what is termed a right or a left-hand tie.

When in use the tie wire is passed around the insulator 11 and over the line wire and is secured to the insulator by a single tie drawing the line wire against the insulator, as in Fig. 4. The tool is then positioned on the line wire at one side of the insulator with the line wire resting in the slot or space 4, and against the inner surface of the connecting member or portion 5, and with the tie wire in the cut-out portion 6 adjacent the insulator. When in this position the tool is locked to the line wire and the operator rotates the tool about the line wire, tightly wrapping the tie wire for its full length about said line wire in even uniformly spaced wrappings, without marking or injuring the line wires, and without leaving any remaining ends as are left by the hand method of tying. The rotation of the tool about the line wire, causes the tie wire to slide through the cut-out in the tool and the action of the wire and the beveled surface of the cut-out causes the said tool to travel a given distance on the line wire for each rotation thereof about the same. The bevel of the surface of the cut-out 6 tends to regulate the spacing of the wrappings from each other.

Having thus described my invention, what I claim as new and desire to protect by Letters Patent is:

1. A tool of the class described, comprising a handle portion and a head, a member overlying the head in spaced relation to one face thereof and united at its upper end thereto, and providing a slot between said head and overlying member, open at its side and lower edges, the side edge of said overlying member formed with an inwardly extending cut having its wall beveled outwardly and downwardly toward the outer side of said head, a tongue projecting over said inwardly extending cut at its lower outer edge, and said head portion provided at its edge below said inwardly extending cut with a groove the wall of which is beveled in a plane substantially parallel with the bevel of the wall of the cut of the overlying member.

2. A tool of the class described, comprising a handle and an integral head in a plane parallel therewith, a member overlying the head in parallel spaced relation to one face thereof and united at its upper edge thereto and providing a slot between said head and overlying member, said slot open at its lower and opposite side edges, said overlying member formed on its side edge with an inwardly extending cut, the side wall of which is beveled outwardly and downwardly toward the outer side of said head, a tongue carried by said overlying member and projecting over said inwardly extending cut at its outer lower edge, said head provided beneath said cut with a groove, the wall of which is beveled in a plane substantially parallel with the bevel of the wall of the cut in the overlying member.

3. A tool of the class described, comprising a handle portion and a head, a member overlying the head in spaced relation to one face thereof and united at its upper end thereto and providing a slot between said head and overlying member open at its side and lower edges, the opposite side edges of said overlying member being each formed with an inwardly extending cut having their respective walls beveled outwardly and downwardly toward their respective sides of said head, a tongue projecting over each of said inwardly extending cuts at its outer lower edge, and said head portion provided at its opposite side edges below said inwardly extending cut with a groove, the wall of which is beveled in a plane substantially parallel with the bevel of the wall of the cut associated therewith in the overlying member.

4. In a tool of the class described, comprising a handle portion and a head, a member overlying the head in spaced relation to one face thereof and united thereto, and providing an open slot between said head and overlying member, the side edge of said overlying member formed with an inwardly extending cut having its wall beveled outwardly and downwardly toward the outer side of said head, and a tongue projecting over said inwardly extending cut at its lower outer edge.

In testimony whereof I have signed my name to this specification in the presence of two subscribing witnesses.

JOHN C. KORTICK.

Witnesses:
W. W. HEALEY,
M. E. EWING.

Copies of this patent may be obtained for five cents each, by addressing the "Commissioner of Patents, Washington, D. C."